United States Patent [19]
Caldwell et al.

[11] 4,007,780
[45] Feb. 15, 1977

[54] HEAT EXCHANGE SYSTEM AND METHOD AND CONTROL DEVICE THEREFOR

[75] Inventors: Edward N. Caldwell; Douglas R. Scott, both of Knoxville, Tenn.

[73] Assignee: Robertshaw Controls Company, Richmond, Va.

[22] Filed: Oct. 24, 1975

[21] Appl. No.: 625,647

[52] U.S. Cl. .............................. 165/39; 236/1 C; 236/49; 236/80 R
[51] Int. Cl.² .......................................... B60H 1/00
[58] Field of Search ................ 165/39, 40; 236/49, 236/1 B, 1 C, 35.2, 80 R

[56] References Cited
UNITED STATES PATENTS

| | | | |
|---|---|---|---|
| 3,719,321 | 3/1973 | McNabney | 236/49 |
| 3,743,180 | 7/1973 | Perkins et al. | 236/49 X |
| 3,876,138 | 4/1975 | Dean | 236/49 |
| 3,880,229 | 4/1975 | Caldwell | 165/40 |

*Primary Examiner*—Edgar W. Geoghegan
*Attorney, Agent, or Firm*—Candor, Candor & Tassone

[57] ABSTRACT

A heat exchange system having a source of heat exchange output fluid for effecting a heat exchange function and having a source of return fluid resulting from the output fluid providing its heat exchange function. A thermally operated element controls the amount of flow of the output fluid from the source in relation to the temperature of the thermally operated element. A sensing device senses the temperature effect of the heat exchange function in relation to a predetermined temperature that the heat exchange system is to provide, the sensing device directing one of the output fluid and the return fluid to the thermally operated element to cause the same to change the amount of flow of the output fluid when the temperature effect deviates from the predetermined temperature by a certain amount whereby the thermally responsive element is subject to a relatively wide swing in temperature for large control movement thereof in relation to a relatively narrow swing in temperature at the sensing device. A velocity feedback arrangement is operatively associated with the sensing device to provide for modular operation of the thermally operated element whereby selection of the maximum volume of the output fluid can be made.

40 Claims, 9 Drawing Figures

HEAT EXCHANGE SYSTEM AND METHOD AND CONTROL DEVICE THEREFOR

This invention relates to a heat exchange system and method of operating the same as well as to a control unit for such a system and method or the like.

As pointed out in the copending patent application, Ser. No. 517,740, filed Oct. 24, 1974, now U.S. Pat. No. 3,973,619, which, in turn is a continuation-in-part application of its copending patent application, Ser. No. 419,606, filed Nov. 28, 1973, now U.S. Pat. No. 3,880,229, all being assigned to the same assignee to whom this application is assigned, but both being sole inventions whereas this present application is a joint invention, it was well known that in forced air heat exchange systems for controlling the temperature in a building or the like, each system utilizes mechanically operated dampers in the forced air supply ducts and a room temperature sensing means will cause its respective damper operator to position the damper in various positions to either increase the amount of flow of duct air or decrease the amount of duct air flow in relation to a deviation in the temperature of the particular room or area being conditioned by such duct from a predetermined temperature setting of such temperature sensing means so that the temperature in the area will tend to be maintained at the selected temperature through the operation of the damper in the duct. Thus, it is a feature of the invention of the aforementioned earliest filed patent application to provide a thermally operated means for controlling such damper means, the thermally operated means opening and closing such duct damper in relation to the temperature of the thermally operated means. One embodiment of that invention provides a heat exchange system having a source of heat exchange fluid for effecting a heat exchange function and having a source of return fluid resulting from the output fluid providing its heat exchange function. A thermally operated means controls the amount of flow of the output fluid from the source that is to be used for the heat exchange function in relation to the temperature of the thermally operated means. Sensing means sense the temperature effect of the heat exchange function in relation to a predetermined temperature that the heat exchange system is to provide. Control means controlled by the sensing means directs one of the output fluid and the return fluid to the thermally operated means to cause the same to change the amount of flow of the output fluid when the temperature effect deviates from the predetermined temperature by a certain amount whereby a relatively wide swing in the temperature of the thermally operated means can be provided even though the sensing means is sensing a relatively narrow swing in temperature from the predetermined temperature to effect the wide swing in temperature of the thermally operated means.

It was found according to the teachings of the invention of the aforementioned last filed patent application that it would be desirable to operate the heat exchange system of the aforementioned earliest filed patent application in a manner to act more like a modulating heat exchange system than a time proportioning heat exchange system.

Accordingly, the invention of the aforementioned last filed patent application provides motion feedback means controlled by the thermally operated means and being operatively associated with the control means of the sensing means to provide for modular operation of the thermally operated means whereby the thermally operated means can cycle over a relatively short stroke of operation thereof rather than either a fully "on" or a fully "off" operation as in the control system of the aforementioned earliest filed patent application.

In particular, one embodiment of the invention of the last filed patent application provides a feedback arrangement wherein a balance beam is provided for controlling a leak port with such balance beam being operatively interconnected to the thermally operated means by spring means so that the thermally operated means will provide motion feedback to such balance beam that is being pivoted by changes in the sensed temperature condition.

However, it was found according to the teachings of the present invention that the thermally operated means can be operatively interconnected to the balance beam by velocity responsive means so that movement of the thermally operated means causes a change in the flow of output fluid and, thus, its velocity whereby the velocity responsive means operates the balance beam to a new position thereof.

With such an arrangement of this invention, it has been found that a selection can be made of the maximum volume of output fluid to be delivered by the system.

Accordingly, it is an object of this invention to provide a heat exchange system having one or more of the novel features set forth above or hereinafter shown or described.

Another object of this invention is to provide a method for operating such a heat exchange system, the method of this invention having one or more of the novel features set forth above or hereinafter shown or described.

Another object of this invention is to provide a control device that can be utilized in such a heat exchange system and method or the like, the control device of this invention having one or more of the novel features set forth above or hereinafter shown or described.

Other objects, uses and advantages of this invention are apparent from a reading of this description, which proceeds with reference to the accompanying drawings forming a part thereof and wherein.

Figure 1:
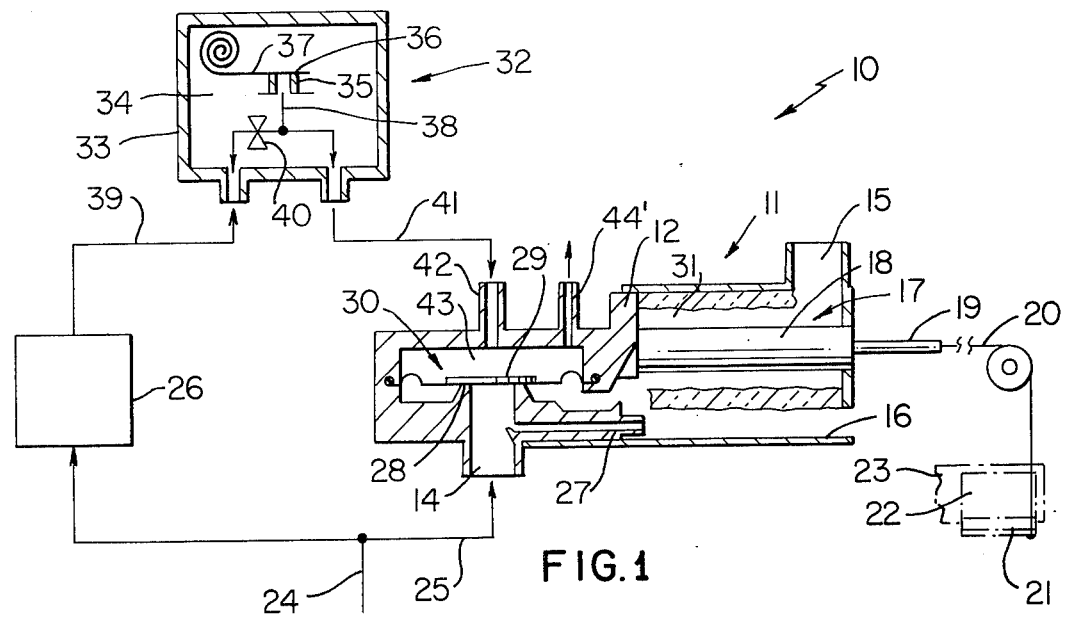
FIG. 1 is a schematic view illustrating the heat exchange system, method and control device of the aforementioned earliest filed patent application.

While the various features of this invention are hereinafter described and illustrated as being particularly adapted to provide a heat exchange system of the forced air type, it is to be understood that the various features of this invention may be utilized singly or in any combination thereof to provide other types of heat exchange systems as desired.

Therefore, this invention is not to be limited to only the embodiments illustrated in the drawings, because the drawings are merely utilized to illustrate one of the wide variety of uses of this invention.

Referring now to FIG. 1, the system and method of the aforementioned earlier filed patent application is generally indicated by the reference numeral 10 and will now be described in order to provide background information for fully understanding the improved features of this invention as hereinbefore set forth.

The control system 10 includes a control device or controller that is generally indicated by the reference numeral 11 and comprises a housing means 12 having a pair of inlets 14 and 15 and an outlet 16. A thermally operated piston and cylinder element 17 is disposed in the housing means 12 and can comprise a plurality of wax charged piston and cylinder elements in the manner set forth in the aforementioned copending patent application or can comprise a single piston and cylinder element as illustrated in FIG. 1 and throughout the other figures of the drawings.

In particular, the piston and cylinder arrangement 17 includes a cylinder means 18 charged with wax or other suitable temperature responsive means that will operate on a piston member 19 to extend the same as illustrated in FIG. 1 when the charge of the cylinder 18 has been heated or to retract the piston 19 when the charge in the cylinder 18 is cooled in a manner hereinafter described.

The piston 19 is interconnected by suitable cable means 20 to a duct damper 21 for opening and closing an outlet opening 22 in a heat exchange duct 23 so that when the damper 21 is opened in the manner illustrated in FIG. 1 upon the thermal element 17 being heated, the duct 23 is adapted to convey its heat exchange fluid out through the opening 22 to provide its heat exchange function in a room containing such opening 22.

Figure 2:
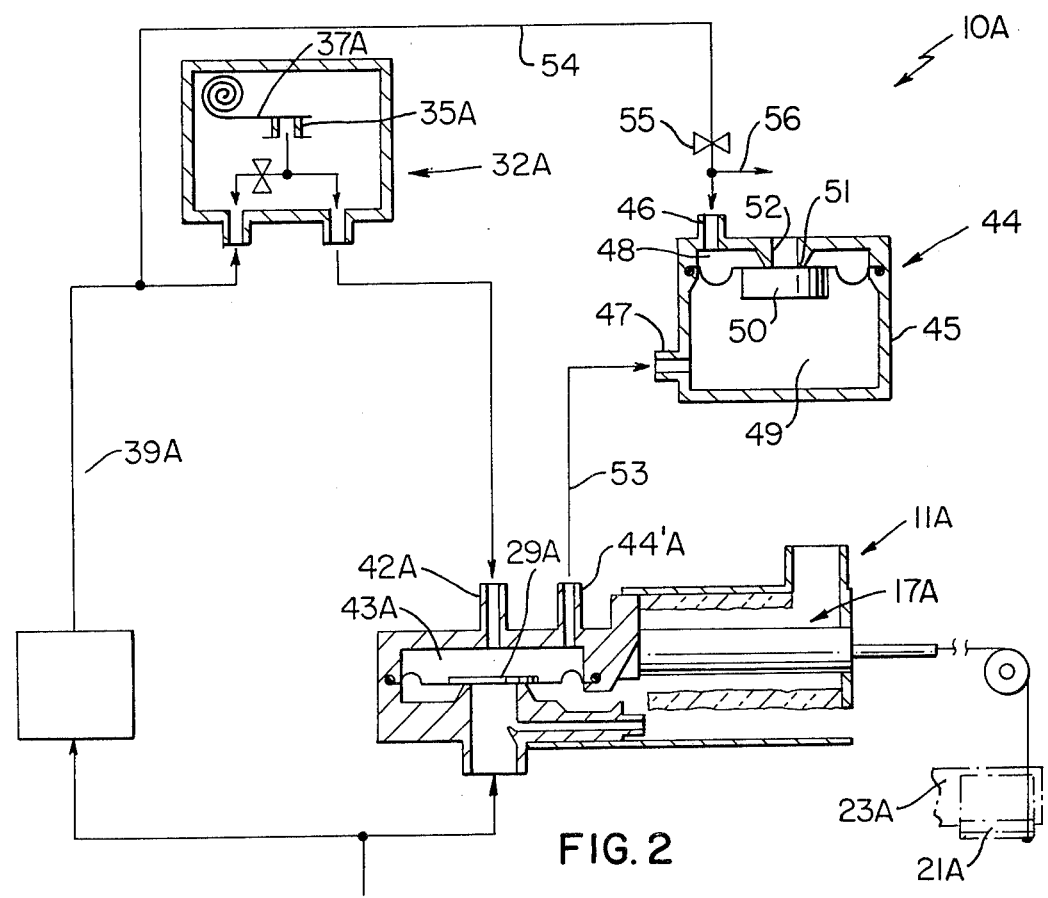
FIG. 2 is a view similar to FIG. 1 and illustrates the system, method and control device of FIG. 1 operating a slave booster relay for operating other duct damper control devices.

In FIGS. 1 and 2 it will be assumed that the heat exchange system and method 10 is in the cooling mode thereof so that the duct 23 is supplying a cooling fluid as opposed to a heating fluid even though it will be apparent that the same can supply heating fluid for a heating mode thereof if desired.

The inlet 14 of the housing 12 is adapted to be continuously supplied duct fluid by an interconnecting passage means 24 that is interconnected to the duct 23 and to a branch passage means 25 that lead to the inlet 14 as well as to a filter 26 for a purpose hereinafter described.

The inlet 14 of the housing 12 is provided with an aspirator nozzle 27 which is adapted to direct fluid from the inlet 14 through the nozzle 27 and into the outlet 16 to tend to draw room air into the inlet 15, across the thermally operated means 17 and out through the outlet 16 when a valve seat 28 of the inlet 14 is closed by a diaphragm operated valve member 29 as illustrated in FIG. 1 and forming part of a diverting valve of the control device 11 that is generally indicated by the reference numeral 30.

The valve seat 28 of the inlet 14 of the housing 12 is adapted to be interconnected to a chamber 31 of the housing 12 that contains the thermally responsive means 17 when the valve member 29 is moved to an open condition as will be apparent hereinafter whereby when the valve member 29 of the diverting valve 30 is open, the duct fluid from the inlet 14 is adapted to flow across the thermally responsive means 17 and out through the passage 15 to the room whereby the duct fluid is adapted to cool the thermally operated means 17 to cause the piston 19 to be retracted and thereby close the damper opening 22 with the damper 21 whereby the heat exchange fluid from the duct 23 will not enter the room containing the same for a purpose hereinafter described so that the room can heat up by atmospheric conditions and the like.

A thermostat for the system 10 is generally indicated by the reference numeral 32 in FIG. 1 and comprises a housing means 33 containing a chamber 34 therein, a leak port 35 being disposed in the chamber 34 and having its outlet end 36 controlled by an adjustable bimetal member 37 which will close the outlet 36 when the same senses that the room being controlled by the controller 11 is too warm and thereby needs cooling fluid from the duct 23 as will be apparent hereinafter. Conversely, when the room is too cool, the bimetal member 37 moves away from the leak port 35 to cause the damper 21 to close in a manner hereinafter described.

The leak port 35 is interconnected by a passage means 38 to a passage means 39 that leads from the filter 26 through a restrictor 40 to another passage 41 that is interconnected to an inlet port 42 of the controller 11 that feeds a chamber 43 of the diverting valve 30 so that when the chamber 43 is pressurized, the diaphragm operated valve 29 will close against the valve seat 28 as illustrated in FIG. 1. If desired, the chamber 43 can be interconnected by another port 44' of the housing 12 to one or more slave units 11 (not shown) in a manner hereinafter described in connection with FIG. 2.

Therefore, it can be seen that the heat exchange system, method and controller 11 of FIG. 1 can be formed from a relatively few parts to operate in a manner now to be described.

As previously stated, assuming that the duct 23 is supplying cooling fluid for cooling a room containing the duct opening 22 and having its temperature sensed by the thermostat 32 so that when the temperature of the room is above a selected temperature of the thermostat 32, the bimetal member 37 closes the opening 36 of the leak port 35 and when the room is too cool, the bimetal member 37 opens the end 36 of the leak port 35.

With the room containing the thermostat 32 being too warm, the bimetal member 37 is disposed closed against the end 36 of the leak port 35 whereby pressure from the duct 23 through the passage means 24, branch passage 25, filter 26, passage 39 and passage 41 to the chamber 43 builds up in the chamber 43 of the controller 11 and closes or maintains the valve member 29 in its closed position against the valve seat 28 to prevent the duct fluid in the inlet 14 from reaching the chamber 31 of the controller 11. However, the duct fluid in the inlet 14 passes through the aspirator 27 to the outlet 16 of the controller 11 and through the well known aspirator function, causes the room air to enter the inlet 15 of the housing 12 and be drawn across the thermally responsive device 17 to be expelled out of the outlet 16 whereby the warm room air heats the temperature operated means 17 and causes the same to be in its expanded condition as illustrated in FIG. 1 whereby the extended piston 19 opens or maintains the damper 21 in its open condition so that the air from the duct 23 is directed into the room to tend to cool the same to the selected temperature of the thermostat 32.

When the temperature in the room reaches or falls slightly below the selected temperature of the thermostat 32, the bimetal member 37 of the thermostat 32 moves away from the end 36 of the leak port 35 to open the same and thereby vent the pressure in the chamber 43 of the controller 11 so that the force of the pressure fluid in the inlet 14 moves the valve member 29 away from the valve seat 28. In this manner, duct fluid from the inlet 14 flows across the temperature operated means 17 and through the outlet 15 of the housing 12 and thereby cools the temperature operated means 17 so that the piston 19 thereof is retracted and through the cable 20 closes the damper 21 of the duct 23. Thus, no more cooling air is fed into the room until the room again heats up to the selected temperature of the thermostat 32 or slightly above the same whereby the controller 11 will again open the damper 21 in the manner previously described.

Figure 4:
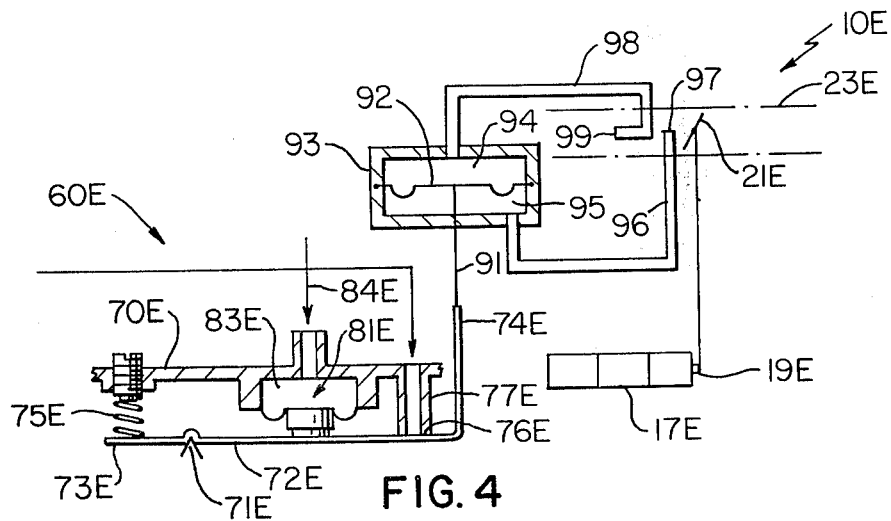
FIG. 4 is a partial view similar to FIG. 3 and illustrates a velocity type of feedback means of this invention.
Figure 5:
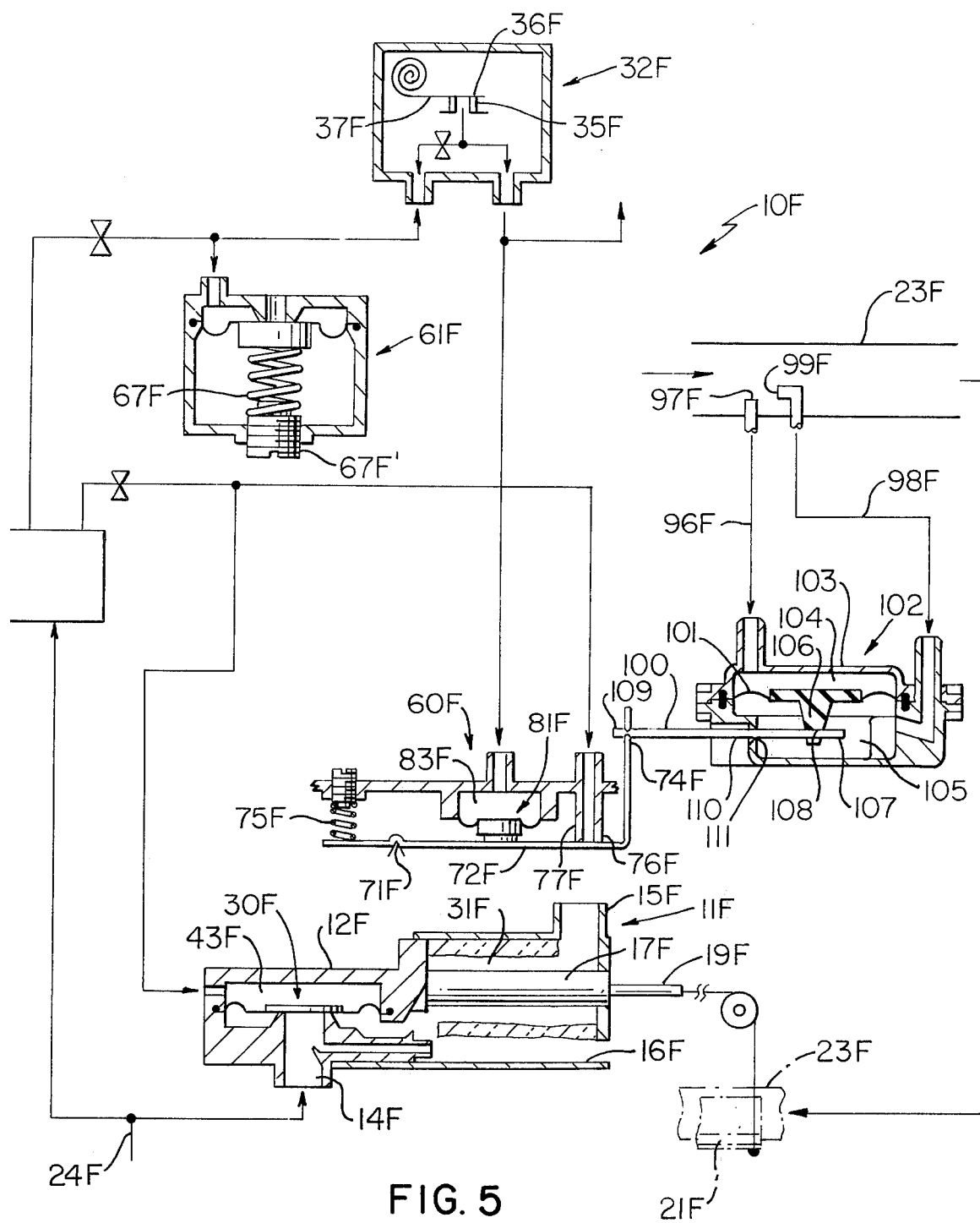
FIG. 5 is a view similar to FIG. 3 and illustrates an embodiment of the improved heat exchange system, method and control device of this invention, FIG. 5 having a velocity feedback means.

Thus, it can be seen that the system, method and control 11 of FIG. 1 provides for a wide swing in the temperature of the fluid passing across the temperature operated means 17 thereof for small increments of change in temperature at the thermostat 32. However, it has been found according to the teachings of the invention of the aforementioned last filed patent application that it may be desirable to provide a modulating action of the damper 21 rather than just the fully opened or fully closed conditions thereof as provided by the system 10 of FIG. 1 as will be apparent hereinafter in connection with the description of this invention as illustrated in FIGS. 4 and 5.

As previously stated, the outlet port 44 of the controller 11 can be interconnected to an inlet port 42 of another controller 11 to operate that other controller 11 in the same manner that the controller 11 of FIG. 1 is being operated by utilizing only the sensing thermostat 32 of FIG. 1 whereby such other controller or controllers would be considered as slave controllers while the main controller 11 of FIG. 1 would be considered as a primary controller.

If desired, such an arrangement can utilize a slave booster relay of this invention that is generally indicated by the reference numeral 44 in FIG. 2 and forming part of a control system 10A having parts thereof similar to the system 10 previously described indicated by like reference numerals followed by the reference letter "A".

As illustrated in FIG. 2, the slave booster relay 44 includes a housing means 45 having a pair of inlets 46 and 47 leading respectively to internal chambers 48 and 49 thereof and separated from each other by a diaphragm operated valve means 50 adapted to open and close a valve seat 51 leading from the chamber 48 to an exhaust port 52.

The slave port 44'A of the controller 11A of FIG. 2 is interconnected by passage defining means 53 to the inlet port 47 of the relay 44 while the passage means 39A is interconnected by a branch passage means 54 through a restrictor 55 to the inlet port 46 of the relay 44 as well as to a passage 56 intermediate the restrictor 55 and the relay 44 that can be directed to the inlet port 42 of a slave controller 11 (not shown) to operate the same in the same manner that the thermostat 32A operates the controller 11A in a manner now to be described.

As previously stated for the system 10, when the room being cooled by the duct 23A is too warm, the bimetal member 37A of the thermostat 32A is in its closed position against the leak port 35A, so that pressure can build up in the chamber 43A of the controller 11A to maintain the valve means 29A in its closed condition whereby the room air will heat and expand the temperature operated means 17A and thereby hold the damper 21A in its open condition to have cooling air tend to cool the room. Since the build up of pressure in the chamber 43A of the controller 11A also builds up in the chamber 49 of the relay 44, the build up in pressure in the chamber 49 maintains the diaphragm valve member 50 against the valve seat 51 so that pressure can build up in the line 56 and, thus, in the chamber 43 of the slave controller 11 and thereby maintain the same in the same operating condition as the controller 11A wherein the same is providing maximum cooling air to the room containing the slave controller.

However, when the room being controlled by the thermostat 32A becomes too cool, the bimetal member 37A opens the leak port 35A so that the valve member 29A can be moved to an open condition and thereby cause the temperature responsive means 17A to close the damper 21A. This loss of pressure in the chamber 43A is likewise lost in the chamber 49 of the relay 44 so that the fluid pressure in the chamber 48 acts on the valve member 50 and moves the same to an open condition to thereby exhaust the fluid from the chamber 43 of the slave controller 11 through the passage 56, inlet 46 of the relay 44 and out through the exhaust passage 52 thereof so that the slave controller will likewise close its damper.

Thus, it can be seen that the slave controllers 11 connected to the passage 56 of the system 10A will be operated in the same manner as the primary controller 11A in the manner previously described.

As previously stated, one of the features of the invention of the aforementioned last filed patent application is to provide for modulating action of the temperature responsive means 17 or 17A of the systems 10 and 10A previously described.

Figure 3:
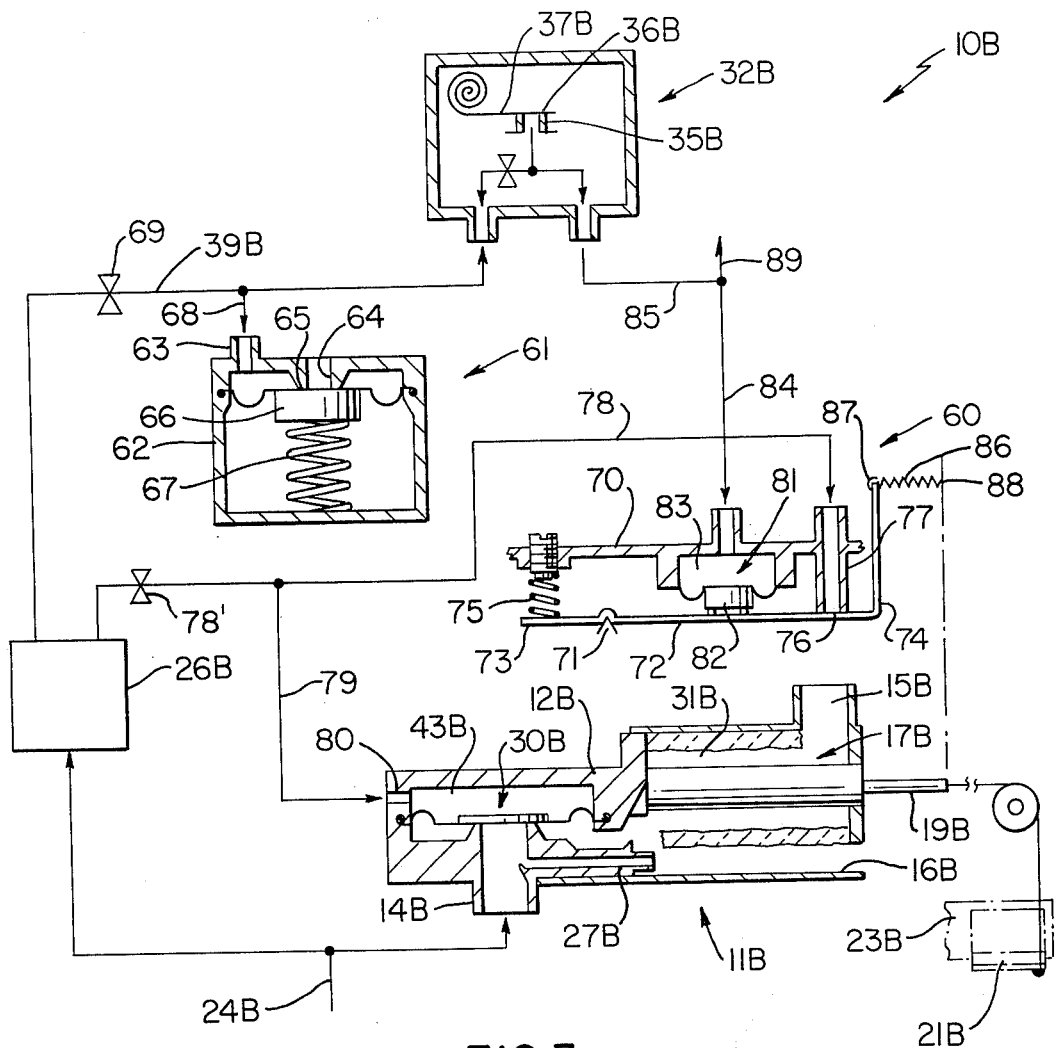
FIG. 3 is a view similar to FIG. 1 and illustrates the improved heat exchange system, method and control device of the invention of the aforementioned last filed patent application.

Accordingly, the system and method of that invention is generally indicated by the reference numeral 10B in FIG. 3 wherein parts thereof similar to the systems 10 and 10A previously described are indicated by like reference numerals followed by the reference letter "B".

As illustrated in FIG. 3, the system 10B includes a thermostat 32B and a controller 11B as well as a motion feed back arrangement of this invention that is generally indicated by the reference numeral 60 and a pressure regulator that is generally indicated by the reference numeral 61.

The thermostat 32B of FIG. 3 is reverse acting and modulates whereas the thermostat 32 of FIG. 1 was direct acting and of an on-off type. Therefore, it can be seen that the magnitude of the signal being developed by the thermostat 32B increases as sensed temperature decreases and, conversely, the magnitude of the signal of the thermostat 32B decreases as the sensed temperature increases when the system 10B of FIG. 3 is being utilized in a cooling mode thereof as will be apparent hereinafter.

The pressure regulator 61 includes a housing 62 provided with an inlet port 63 and an exhaust port 64 respectively separated from each other by a valve seat 65 adapted to be opened and closed by a diaphragm operated valve means 66 normally urged to a closed position by a compression spring 67. The compression spring 67 can be made adjustable in a manner well known in the pressure regulator art so that the pressure regulator 61 will tend to maintain the pressure in the passage 39B at a selected pressure level as the inlet 63 of the regulator 61 is interconnected to the passage 39B by an interconnecting passage 68 interconnected to the passage 39B intermediate the thermostat 32B and a restrictor 69 disposed in the passage 39B.

The feedback arrangement 60 can form a part of the controller 11B by being attached to the housing means 12B thereof in any suitable manner. Thus, the feedback arrangement 60 includes a stationary housing or frame means 70 carrying a fixed fulcrum point 71 against which a balance beam 72 is pivotally mounted intermediate its ends 73 and 74, the end 73 of the beam 72 being urged in a counter clockwise direction in FIG. 3 by an adjustable compression spring 75 disposed between the stationary frame 70 and the end 73 of the beam 72. The other end 74 of the beam 72 is adapted to control an open end 76 of a leak port 77 that is interconnected by a passage 78 to the filter 26B as well as to a branch passage 79 that is interconnected to an inlet port 80 of the controller 11B, the inlet port 80 being interconnected with the chamber 43B of the controller 11B for a purpose hereinafter described. The passage 78 has a restrictor 78 therein intermediate the filter 26B and the interconnection of the passage 78 with the branch passage 79.

The frame 70 of the feedback arrangement 60 includes a pneumatically operated actuator that is generally indicated by the reference numeral 81 and comprises a diaphragm operator 82 for bearing against the end 74 of the beam 72 and cooperating with the frame 70 to define a chamber 83 therewith that is interconnected by a passage 84 to a passage 85 leading from the leak port 35B of the thermostat 32B for a purpose hereinafter described whereby when the pressure in the chamber 83 of the actuator 81 builds up, the same tends to pivot the beam 72 in a clockwise direction about the fulcrum point 71 in opposition to the force of the compression spring 75 as well as in addition to the force of a feedback tension spring 86 having one end 87 interconnected to the end 74 of the beam 72 and the other end 88 interconnected to the piston 19B of the temperature operated means 17B of the controller 11B. In this manner, the force of the tension spring 86 tends to pivot the beam 72 in a clockwise direction about the fulcrum point 71 in opposition to the force of the compression spring 75, the force of the tension spring 86 increasing as the piston 19B of the temperature operated means 17B is extended and decreasing as the piston 19B is retracted as will be apparent hereinafter.

Thus, it can be seen that by merely adding the feedback arrangement 60 previously described to the controller 11B and changing the thermostat 32B from the thermostat 32 previously described, the controller 11B can be operated in a modulating manner rather than being fully on or fully off as in the controller 11 previously described in the system 10 of FIG. 1.

In particular, the operation of the system and method 10B, as well as the operation of controller 11B of FIG. 3, will now be described.

Assuming that the system 10B is in the cooling mode thereof and that when the bimetal member 37B is forced closed against the leak port 35B by the thermostat 32B sensing that the room is too cool, the regulator 61 will permit the thermostat 32B to deliver a pressure of approximately 0.45 inches of water to the chamber 83 of the actuator 81 demanding that the damper 21B be in its fully closed condition. Conversely, when the bimetal member 37b is disposed fully away from the leak port 34B because the thermostat 32B senses that the room is too hot, the system 10B will only develop a pressure of approximately 0.15 inches of water in the chamber 83 of the acutator 81 so that the damper 21B will be disposed in its fully open position as illustrated in FIG. 3 in a manner hereinafter described. However, any position of the bimetal member 37B between its fully opened and fully closed position relative to the leak port 35B as described above will cause the damper 21B to be in a partially opened position thereof in a manner now to be described whereby the system 10B is a modulating system rather than a time proportioning system as in FIGS. 1 and 2.

For example, assuming that the room containing the thermostat 32B is too cool so that the bimetal member 37B is disposed fully closed against the leak port 35B, the thermostat 32B causes a high pressure build up in the chamber 83 of the actuator 81 to tend to pivot the beam 72 in a clockwise direction whereby the end 74 of the beam 72 is fully moved away from the end 76 of the leak port 77 to thereby exhaust the chamber 43B of the controller 11B through the passage means 79, 78 and open leak port 77, the restriction 78' permitting such dumping of such pressure in the chamber 43B. Thus, the diverter valve 30B opens the inlet 14B to interconnect the duct passage 24B to the chamber 31B of the controller 11B and thereby cause the cooling air in the duct passage 24B to pass across the temperature operated means 17B and cool the same so that the piston 19B is retracted to fully close the damper 21B and thereby permit the room air containing the thermostat 32B to heat up. Such retracting movement of the piston 19B decreases the tension force of the spring 86 acting on the beam 72 tending to move the same to its open position so that it requires the full pressure of approximately 0.45 inches of pressure in the chamber 83 of the actuator 81 to continue to overcome the force of the compression spring 75 to maintain the controller 11B in its full damper closed position as the force of the tension spring 86 adding to the force of the actuator 81 has now decreased.

However, should the temperature of the room not be at such coolness below the set temperature of the thermostat 32B that would require full closing of the damper 21B as previously described, the bimetal member 37B is only disposed closely adjacent the end 36B of the leak port 35B so that the full pressure does not build up in the chamber 83 of the actuator 81. For example, the fixed position of the bimetal member 37B may be such that the same is creating a pressure of approximately 0.30 of an inch of water in the chamber 83 of the actuator 81 which is in a middle pressure condition between the high and low pressure conditions of the thermostat 32B as previously described.

When the chamber 83 of the actuator 81 is only being supplied a pressure of approximately 0.30 inches of water, the same will pivot the beam 72 in a clockwise direction from the position illustrated in FIG. 3 to open the leak port 77 and thereby cause the diverting valve 30B to open and cause the cool duct air in duct passage 24B to pass across the temperature operated means 17B so as to begin to retract the piston 19B thereof and thereby begin to close the damper 21B. As the piston 19B begins to retract, the same decreases the force of the tension spring 86 acting to open the beam away from the leak port 77 so that when the piston 19B is retracted to only half of its retracted condition whereby the damper 21B is only in its half-way closed or opened position, the decreased force of the tension spring 86 is such that the force of the compression spring 75 now overcomes the force of the actuator 81 and causes the beam 72 to again close against the end 76 of the leak port 77 as illustrated in FIG. 3. Thus, the diverting valve 30B now closes through the buildup of pressure in the chamber 43B thereof from the duct inlet 27B, filter 26B, passage 78 and branch passage 79 so that the room air will again be directed across the temperature operated means 17B to cause the same to expand and thereby further open the damper 21B toward its fully opened position. At this time, should the room still be too cool, the thermostat 32B will again cause the actuator 81 to cause the controller 11B to close the damper 21B half-way as previously described.

Thus, the diverting valve 30B will cycle between the open and closed positions thereof causing the temperature operated means 17B to only operate through part of its stroke for cycling the damper 21B in its opening and closing directions as long as the pressure in the actuator 81 is half-way between the high and low pressures that are adapted to be produced by the thermostat 32B for fully opening and closing the damper 21B.

In this manner, it is believed that the temperature operated means 17B will have a longer life than the temperature operated means 17 provided in the system 10 wherein the temperature operated means 17 is either fully extended or fully retracted throughout its operating cycles whereas the temperature operated means 17B of the system 10B is operated in a modulating manner, and, thus, through only part of its full stroke.

Should the temperature of the room which contains the system 10B become too warm and thereby cause the bimetal member 37B to be moved fully away from the end 36B from the leak port 35B, the pressure in the actuator will drop to approximately 0.15 inches of water whereby the spring 75 is sufficient to maintain the beam 72 in its fully closed position against the end 76 of the leak port 77 and thereby cause the diverting valve 30B to be in its fully closed position as illustrated in FIG. 3. Thus, the temperature operated means 17B will be in its fully extended position as the hot room air will be directed across the same from the inlet 15B of the controller 11B to the outlet 16B thereof in the manner previously described to tend to maintain the damper 21B in its fully opened position to permit the room to cool.

Thus, it can be seen that the system 10B, through the feedback arrangement 60, permits the controller 11B and, thus, the damper 21B to be operated in a modulating manner rather than in the fully on or fully off positions thereof as provided in the system 10 of the aforementioned earliest filed patent application because the damper 21B can be positioned anywhere between its fully opened or fully closed position by the controller 11B in the manner previously described.

Reference is now made to FIG. 4 wherein a control system of this invention is generally indicated by the reference 10E and parts thereof similar to the system 10B previously described are indicated by like reference numerals followed by the letter "E".

As illustrated in FIG. 4, the balance beam 72E has its end 74E directly interconnected by a tying means 91 to a flexible diaphragm 92 that is adapted to be positioned relative to a housing means 93 in relation to velocity or volume of fluid flow through the duct 23E that is controlled by the damper 21E positioned by the temperature means 17E in the manner previously described.

The flexible diaphragm 92 divides the housing 93 into two chambers 94 and 95, the chamber 95 reading static pressure in the duct 23 E on the upstream side of the damper 21E by having a tube 96 leading therefrom and provided with its end 97 disposed transverse to the flow of fluid through the duct 23E and upstream of the damper 21E whereas the chamber 94 senses both velocity and static pressure of the duct 23E by having an interconnecting tube 98 leading therefrom and provided with its end 99 facing the flow of fluid in the duct 23E upstream of the damper 21E. In this manner, the differential between the pressure in the chambers 94 and 95 of the housing 93 will position the diaphragm 92 relative to housing 93 and, thus, the amount of force acting on the end 74E of the beam 72E in opposition to the force of the compression spring 75E in a manner now to be described.

Assuming that the system 10E is operating in the cooling mode thereof in the same manner as the system 10B previously described and assuming that the room containing the thermostat is too cool so that the bimetal member is fully closed against the leak port, the thermostat causes a high pressure build up in the chamber 83E of the actuator 81E to tend to pivot the beam 72E in a clockwise direction about the fulcrum point 71E whereby the end 74E of the beam 72E is fully moved away from the end 76E of the leak port 77E to thereby exhaust the chamber of the controller. Thus, the diverting valve of the controller opens its inlet to interconnect the duct passage to the chamber of the controller and thereby cause the cooling air in the duct to pass across the temperature operated means 17E and cool the same so that the piston 19E is retracted to fully close the damper 21E and thereby permitting the room air containing the thermostat to heat up. Such retracting movement of the piston 19E of the temperature operated means 17E to close the damper 21E causes a decrease in the velocity of the fluid flow in the duct 23E and, thus, a decrease of the pressure in the chamber 94 of housing 93 tending to move the beam 72E in a clockwise direction about the fulcrum 71E st that the force of the compression spring 75E is adapted to overcome the force of the pressure in the chamber 83E of the actuator 81E if the same is not at the full pressure of approximately 0.45 inches of water pressure. However, should the temperature of the room not be at such a coolness below the temperature setting of the thermostat which would require full closing of the damper 21E as previously described, the bimetal member of the thermostat is only disposed closely adjacent the end of its leak port so that full pressure does not build up in the chamber 83E of the actuator 81E. For example, assume that such position of the bimetal member of the thermostat is such that it is creating a pressure of approximately 0.30 of an inch of water in the chamber 83E of the actuator 81E which is in a middle pressure condition between the high and low pressure producing temperatures of the thermostat as previously described.

With the chamber 83E of the actuator 81E only being supplied pressure of approximately 0.30 inches of water, the same will pivot the beam 72E in a clockwise direction from the position illustrated in FIG. 4 to open the leak port 77E and thereby cause the diverting valve to open and cause the cool duct air to pass across the temperature operated means 17E so as to begin to retract the piston 19E thereof and start to close the damper 21E. As the damper 21E begins to close, the pressure in the chamber 94 of the housing 93 decreases and thereby decreases the diaphragm force on the beam 72 tending to move the same to an open condition relative to the leak port 77E so that the force of the compression spring 75E recloses the beam 72E against the leak port 77E when the damper 21E has been moved to only half-way of its closed position. Thus, the diverting valve now closes through the build up of pressure in the chamber thereof so that the room air will again be directed across the temperature operated means 17E to cause the same to heat up and thereby start to more fully open the damper 21E. At this time, should the room still be too cool, the thermostat will again cause the actuator 81E to cause the controller to close the damper 21E halfway as previously described.

Thus, the diverting valve will cycle between the open and closed positions thereof causing the temperature operated means 17E to only operate through part of its stroke for causing opening and closing movement of the damper 21E as long as the pressure in the actuator 81E is halfway between the high and low pressures that are adapted to be produced by the thermostat.

Should the temperature of the room containing the system 10E become too warm and thereby cause the bimetal member of the thermostat to be moved fully away from the end of its leak port, the pressure in the actuator 81E will drop to approximately 0.15 inches of water whereby the spring 75E is sufficient to maintain the beam 72E in its fully closed position against the end 76E of the leak port 77E to thereby cause the diverting valve of the controller to be in its fully closed position. Thus, the temperature operated means 17E will be in its fully extended position as the hot room air will be directed across the same from the inlet of the controller to its outlet in the manner previously described to maintain the damper 21E in its fully opened position to permit the room to cool.

Thus, it can be seen that the system 10E of this invention, through the feedback arrangement 60E, permits the controller and, thus, the damper 21E to be operated in a modulating manner rather than in the fully on or fully off positions thereof as provided by the system 10 of the aforementioned earliest filed patent application because the damper 21E can be positioned anywhere between its fully opened or fully closed position by the controller with the feedback arrangement 60E being in relation to velocity or volume of fluid flow through the duct rather than in relation to piston motion as in feedback arrangement 60 previously described.

Figure 6:
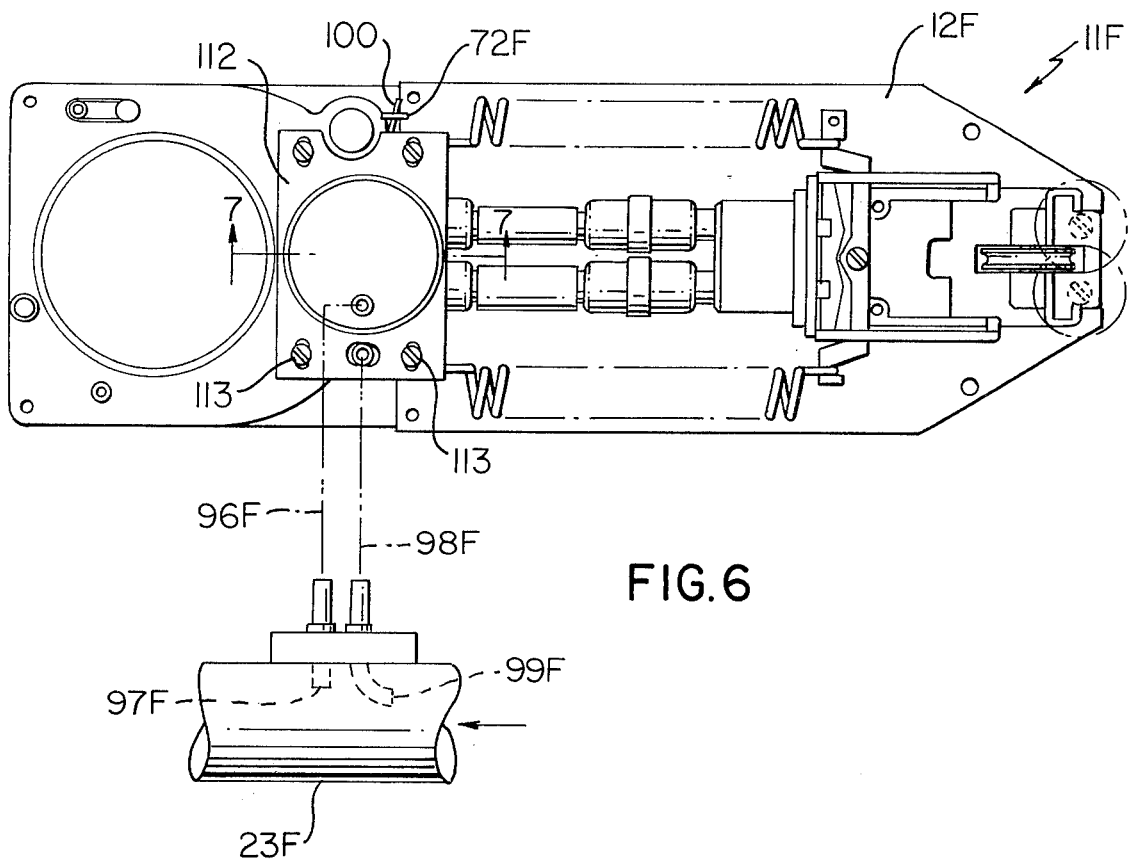
FIG. 6 is a top schematic view of the apparatus for the system of FIG. 5.
Figure 7:
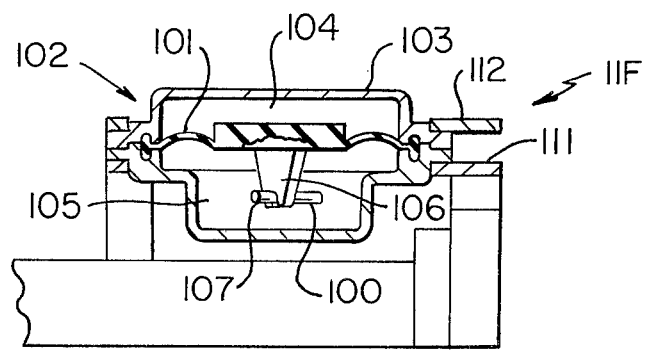
FIG. 7 is a fragmentary cross-sectional view taken on line 7—7 of FIG. 6.

Another embodiment of this invention utilizing a velocity or volume of fluid flow feedback arrangement similar to FIG. 4 is generally indicated by the reference numeral 10F in FIGS. 5–7 and parts thereof similar to the systems 10B and 10E previously described or indicated by like reference numerals followed by the letter "F".

As illustrated in FIG. 5, the balance beam 72F has its upper end 74F interconnected by a pivotally mounted lever 100 to a flexible diaphragm 101 of a velocity responsive device or means that is generally indicated by the reference numeral 102 and is adpated to be carried by the housing means 12F of the controller 11F as illustrated in FIGS. 6 and 7 and as hereinafter described.

The velocity responsive means 102 has a housing means 103 divided into two chambers 104 and 105 by the flexible diaphragm 101, the chamber 104 being interconnected by a suitable conduit means 96F to a port 97F disposed in the duct 23F while the chamber 105 is interconnected by a conduit 98F to the stream or fluid flow facing port 99F in the duct 23F as illustrated in FIGS. 5 and 6. Thus, the position of the diaphragm 101 in the housing means 103 is varied in relation to the velocity of the output fluid in the duct 23F upstream of the damper 21F in the same manner as the diaphragm 92 of FIG. 4. Also see the McNabney, U.S. Pat. No. 3,719,321 for a similar duct velocity responsive device.

However, the diaphragm 101 of the velocity responsive device 102 of this invention has an enlarged central portion 106 receiving one end 107 of the lever 100 in a suitable opening 108 thereof while the other end 109 of the lever 100 is interconnected to the end 74F of the balance beam 72F as illustrated in FIG. 5, an intermediate portion 110 of the lever 100 being pivotally mounted in a knife edge opening 111' of the housing means 103 as illustrated.

The housing means 103 of the velocity responsive means 102 is readily adapted to be clamped to the housing means 12F of the controller 11F between plate means 111 and 112 of the housing means 12F that is fastened together by fastening means 113 in the manner illustrated in FIGS. 6 and 7 so that the lever 100 can be interconnected to the balance beam 72F as illustrated, the housing means 12F being substantially the same as the housing means of the controller fully described and claimed in the aforementioned earlier filed patent application whereby further details of the structure of the housing means 12F need not be described in this application as reference can be made to such issued patent for further details of its structure and operation if desired.

The operation of the system 10F of this invention will now be described.

Assuming that the system 10F is operating in the cooling mode thereof in the same manner as the systems 10B and 10E previously described and assuming that the room containing the thermostat 32F is too cool so that the bimetal member 37F is fully closed against the leak port 35F, the thermostat 32F causes a high pressure build up in the chamber 83F of the actuator 81F to tend to pivot the beam 72F in a clockwise direction about the fulcrum point 71F whereby the end 74F of the beam 72F is fully moved away from the end 76F of the leak port 77F to thereby exhaust the chamber 43F of the controller 11F. Thus, the diverter valve 30F of the controller 11F opens its inlet 14F to interconnect the duct passage 24F to the chamber 31F of the controller 11F and thereby cause the cooling air in the duct 23F to pass across the temperature operated means 17F and cool the same so that the piston 19F is retracted to fully close the damper 21F and thereby permit the room air containing the thermostat 32F to heat up. Such retracting movement of the piston 19F of the temperature operating means 17F to close the damper 21F causes a decrease in the velocity of the fluid flow in the duct 23F and, thus, a decrease of the pressure in the chamber 105 of the housing 103 of the velocity responsive device 102 tending to move the beam 72F in a clockwise direction about the fulcrum 71F so that the force of the compression spring 75F is adapted to overcome the force of the pressure in the chamber 83F of the actuator 81F if the same is not at the full pressure thereof.

However, if the temperature of the room is not at such a coolness below the temperature setting of the thermostat 32F which would require full closing the damper 21F as previously described, the bimetal member 37F of the thermostat 32F is only disposed closely adjacent to the end 36F of its leak port 35F so that the full pressure does not build up in the chamber 83F of the actuator 81F.

With the chamber 83F of the actuator 81F only being supplied a partial pressure from the thermostat 32F, the actuator 81F would pivot the beam 72F in the clockwise direction from the position illustrated in FIG. 5 to open the leak port 77F and thereby cause the diverting valve 30F to open and cause the cool air from the duct 23F to pass across the temperature operated means 17F so as to begin to retract the piston 19F thereof and start to close the damper 21F. As the damper 21F begins to close, the pressure in the chamber 105 of the velocity responsive means 102 decreases and thereby decreases the diaphragm force on the beam 72F tending to move the same to an open condition relative to the leak port 77F so that the force of the compression spring 75F recloses the beam 72F against the leak port 77F when the damper 21F has been moved to only part of its closed position.

Thus, the diverting valve 30F now closes through the build up of pressure in the chamber 43F thereof so that the room air will again be directed across the temperature operating means 17F to cause the same to heat up and thereby start to more fully open the damper 21F. At this time, should the room be too cool, the thermostat will cause the actuator 81F to cause the controller 11F to close the damper 21F part way as previously described.

Accordingly, the diverting valve 30F will cycle between the open and closed positions thereof causing the temperature operating means 17F to only operate through part of its stroke and causing opening and closing movement of the damper 21F as long as the pressure in the actuator 81F is half way between the high and low pressures that are adapted to be produced by the thermostat 32F.

Should the temperature of the room containing the system 10F become too warm and thereby cause the bimetal member 37F of the thermostat 32F to be moved fully away from the end 36F of its leak port 35F, the pressure in the actuator 81F will drop whereby the spring 75F is sufficient to maintain the beam 72F in its fully closed position against the end 76F of the leak port 77F to thereby cause the diverting valve 30F of the controller 11F to be in its fully closed position. Thus, the temperature operating means 17F will be in its fully extended position as the hot room air will be directed across the same from the inlet 15F of the controller 11F to its outlet 16F in a manner previously described to maintain the damper 21F in its fully open position to permit the room to cool.

However, should the thermostat 32F be providing a specific signal, changes in the static pressure in the duct 23F will change the air velocity being sensed by the device 104 and thereby unbalance the feedback beam 72F and cause the controller 11F to move the damper 21F to a position which causes the velocity of the fluid in the duct 23F to rebalance the feedback lever 72F back to its previous position. Thus, the pressure regulator 61F which controls the supply of air to the thermostat 32F can become a manually adjustable maximum volume control through any suitable means for adjusting the force of the compression spring 67F, such as an adjusting screw 67F' as illustrated in FIG. 5. For example, if the controller 11F is calibrated to give zero percent CFM with a thermostat signal of 0.05 inches of water and 100 percent CFM at 0.5 inches of water, a regulator setting of 0.27 inches will prevent the thermostat 32F from ever putting out more than 0.27 inches so that the maximum CFM is something less than 100 percent, and in this instance, on the order of fifty percent.

Thus, it can be seen that the system 10F of this invention, through the feedback arrangement 60F, permits the controller 11F and, thus, the damper 21F to be operated in a modulating manner rather than in the fully on or the fully off position thereof as provided for the system 10 of the aforementioned earliest filed patent application because the damper 21F can be positioned anywhere between its fully opened or fully closed position by the controller 11F with the feedback arrangement 60F being in relation to the velocity or volume of fluid flow through the duct 23F rather than in relation to piston motion as in the feedback arrangement 60 previously described.

Figure 8:
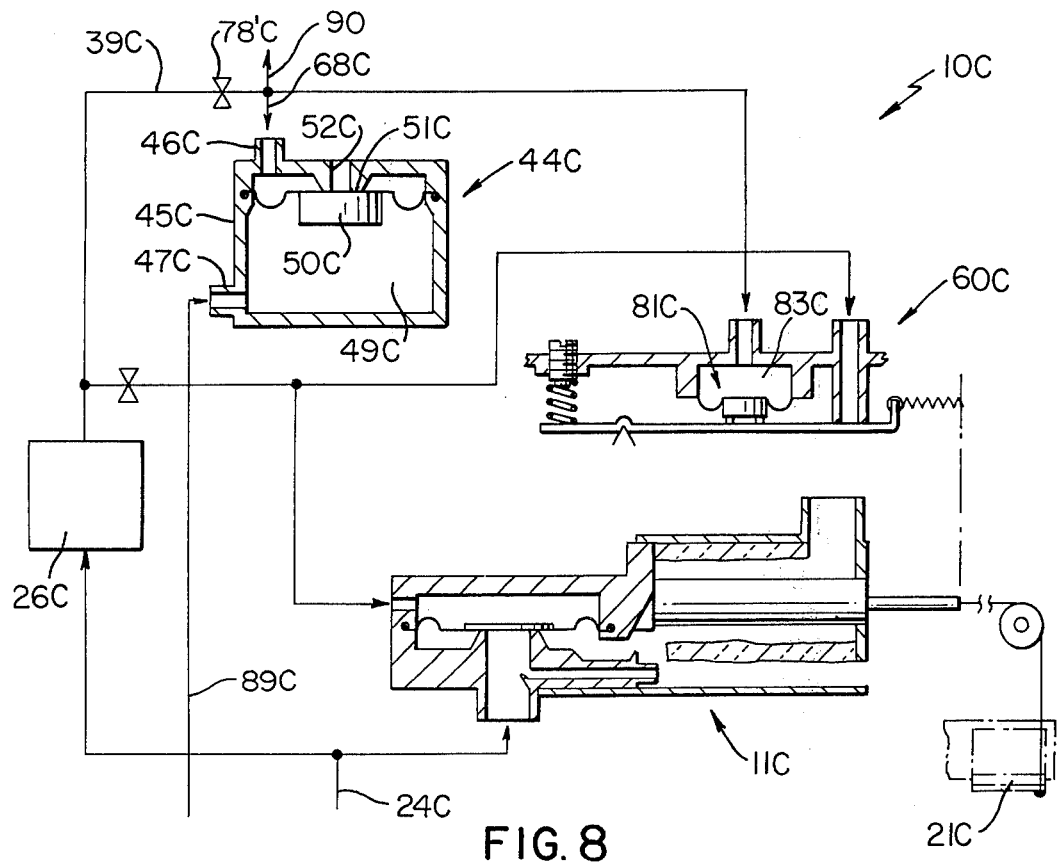
FIG. 8 is a view similar to FIG. 3 and illustrates the system, method and control device of the invention of the aforementioned last filed patent application operating as a self-contained slave unit with a booster relay for operating other slave units.

Should it be desired to interconnect the system 10B of FIG. 3 to a slave controller arrangement, the passage 85 thereof could be interconnected to a slave booster through an interconnecting passage 89 that is indicated by the reference numeral 89 in FIG. 3 and reference numeral 89C in FIG. 8, the slave system of FIG. 8 being generally indicated by the reference numeral 10C and parts thereof similar to the systems 10, 10A and 10B previously described are indicated by like reference numerals followed by the reference letter "C".

As illustrated in FIG. 8, the controller 11C is substantially identical to the controller 10B of FIG. 3 as the same includes the feedback arrangement 60C, filter 26C, restrictor 78'C and duct inlet means 24C previously described. However, the passage 89C is interconnected to an inlet port 47C of a booster relay 44C that has the housing means 45C, inlet port 46C, valve seat 51C, exhaust port 52C and diaphragm valve means 50C.

Thus, the booster relay 44C has its passage 46C interconnected by the passage 68C to the passage 39C but instead of the passage 39C being interconnected to the thermostat, it is directly interconnected to the chamber 83C of the actuator 81C of the feedback arrangement 60C for the controller 11C. If desired, the passage 68C could also be interconnected by a passage 90 to other self-contained slave controllers similar to the slave controller 11C illustrated in FIG. 8.

In this manner, the booster relay 44C permits each slave unit 11C, etc. to have its own supply from the duct it controls as the thermostat supply is separate therefrom and will not effect the operation of the slave supply.

Accordingly, it can be seen that when the pressure in the chamber 49C of the booster relay 44C drops a certain amount to cause the valve member 50C to open a certain amount corresponding to the pressure in the chamber 81 of the acutator 83 of the controller 11B of FIG. 3 in the manner previously described, the booster relay 44C causes a similar change in the pressure in the chamber 83C of the actuator 81C of the feedback arrangement 60C for the controller 11C to cause the controller 11C to operate the damper 21C in exactly the same manner that the damper 21B is being operated by the thermostat 32B of the system 10B of FIG. 3 for the reasons previously set forth.

Figure 9:
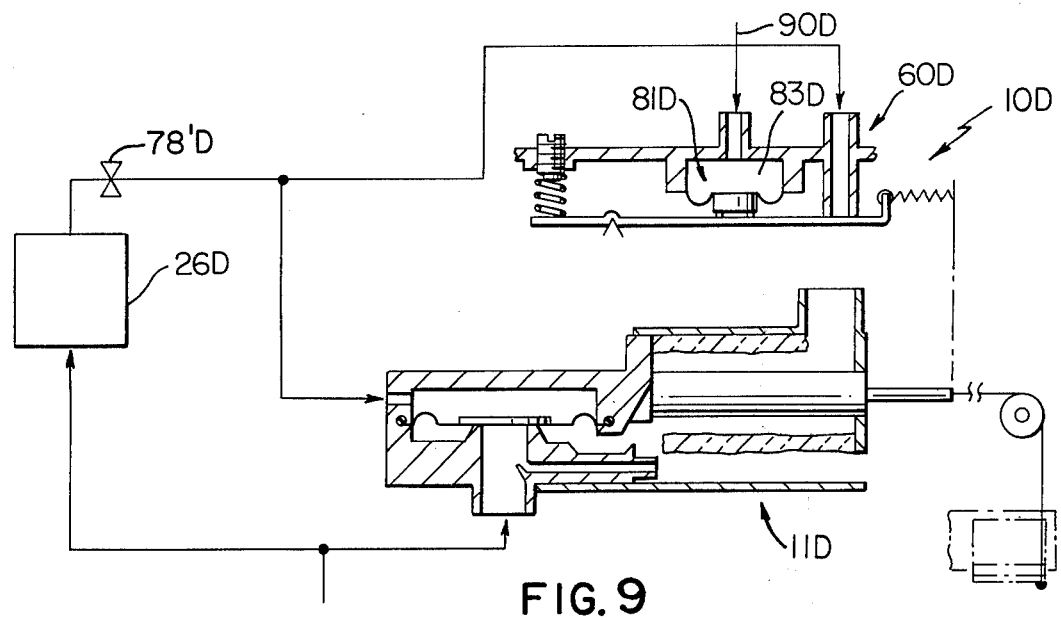
FIG. 9 is a view similar to FIG. 3 and illustrates the slave unit operated by the system of FIG. 3.

As previously stated, the passage 90 of the system 10C could be interconnected to an actuator of another self-contained slave unit, such as the actuator 81D of the system 10D of FIG. 9 wherein parts thereof similar to the systems 10, 10A, 10B and 10C previously described are indicated by like reference numerals followed by the reference letter "D".

Thus, it can be seen that the passage 90D is directly interconnected to the chamber 83D of the actuator 81D of the feedback arrangement 60D of the controller 11D to cause operation of the controller 11D in the same manner that the thermostat 32B of FIG. 3 is operating the controller 11B of FIG. 3 and the controller 11C of FIG. 8 as previously described.

Therefore, it can be seen that by utilizing the motion feedback arrangement 60 of this invention, the same can be utilized either with a primary controller 11B, or slave controllers 11C and 11D as illustrated in FIGS. 8 and 9 to provide for modular operation of such controllers.

Thus, it can be seen that this invention not only provides an improved heat exchange control system and method of operating the same, but also this invention provides an improved control device for such a system and method.

While the forms and methods of this invention now preferred have been described and illustrated as required by the Patent Statute, it is to be understood that other forms and method steps can be utilized and still come within the scope of the appended claims.

What is claimed is:

1. A heat exchange system comprising a zone to be treated, a source of heat exchange output fluid for effecting a heat exchange function in said zone, a source of return fluid resulting from said output fluid providing its heat exchange function in said zone, thermally operated means for controlling the amount of flow of said output fluid from said source that is to be utilized for said heat exchange function in said zone in relation to the temperature of said thermally operated means, sensing means for sensing the temperature effect of said heat exchange function in said zone in relation to a predetermined temperature that said heat exchange system is to provide in said zone, and control means controlled by said sensing means for directing one of said output fluid and said return fluid to said thermally operated means to cause the same to change the amount of flow of said output fluid when said temperature effect in said zone deviates from said predetermined temperature by a certain amount, said control means having means that causes said control means to operate said thermally operated means in a modulating manner, said means of said control means comprising velocity responsive means responsive to the velocity of said flow of said output fluid from said source.

2. A heat exchange system as set forth in claim 1 wherein said output fluid is a cooling fluid.

3. A heat exchange system as set forth in claim 1 wherein said output fluid is a heating fluid.

4. A heat exchange system as set forth in claim 1 wherein said thermally operated means comprises wax charged piston and cylinder thermal means.

5. A heat exchange system as set forth in claim 1 wherein said means of said control means also comprises feedback means controlled by said thermally operated means and being operatively associated with said control means to provide for said modular operation of said thermally operated means.

6. A heat exchange system as set forth in claim 5 wherein said feedback means comprises a balance beam arrangement.

7. A heat exchange system as set forth in claim 6 wherein said balance beam arrangement has a leak port means and a pivotally mounted beam for opening and closing said leak port means, said thermally operated means being operatively interconnected to said beam by said velocity responsive means whereby movement of said thermally operated means causes a change in the force of said velocity responsive means acting on said beam.

8. A heat exchange system as set forth in claim 7 wherein said sensing means is operatively associated with said beam to tend to pivot said beam in relation to changes in sensed temperature effects.

9. A heat exchange system as set forth in claim 7 wherein said control means controlled by said sensing means comprises a fluid operated valve means for directing said output fluid to said thermally operated means when said sensing means moves said valve means to one of its operating positions, said leak port means being operatively associated with said fluid operated valve means for operating the same.

10. A heat exchange system as set forth in claim 9 wherein said means controlled by said sensing means comprises an aspirator for drawing said return fluid to said thermally operated device when said aspirator has fluid directed therethrough, said valve means causing output fluid to be directed through said aspirator when said sensing means moves said valve means to another operating position thereof.

11. A heat exchange system as set forth in claim 7 wherein said velocity responsive means includes a flexible diaphragm that is moved in response to changes in said velocity of said flow of said output fluid, said velocity responsive means having interconnecting means interconnecting said diaphragm to said beam.

12. A heat exchange system as set forth in claim 11 wherein said interconnecting means comprises a pivotally mounted lever having one end interconnected to said flexible diaphragm and the other end thereof interconnected to said beam.

13. A heat exchange system as set forth in claim 11 wherein said system has a duct for directing said flow of said output fluid to said zone, said duct having a damper therein that is controlled by said thermally operated means to change the velocity of flow through said duct.

14. A heat exchange system comprising a zone to be treated, a source of heat exchange output fluid for effecting a heat exchange function in said zone, a source of return fluid resulting from said output fluid providing its heat exchange function in said zone, thermally operated means for controlling the amount of flow of said output fluid from said source that is to be utilized for said heat exchange function in said zone in relation to the temperature of said thermally operated means, selecting means for selecting within limits the maximum amount of flow of said output fluid for said zone, and control means controlled by said selecting means for directing one of said output fluid and said return fluid to said thermally operated means to cause the same to change the amount of flow of said output fluid to said zone when said output flow deviates from the selected amount by a certain amount.

15. A heat exchange system as set forth in claim 14 wherein said control means has means that causes said control means to operate said thermally operated means in a modulating manner, said means of said control means comprising velocity responsive means responsive to the velocity of said flow of said output fluid from said source.

16. A heat exchange system as set forth in claim 14 wherein said output fluid is a cooling fluid.

17. A heat exchange system as set forth in claim 14 wherein said output fluid is a heating fluid.

18. A heat exchange system as set forth in claim 14 wherein said selecting means comprises an adjustable pressure regulator.

19. A control unit for a heat exchange system or the like comprising a housing means having means adapted to receiving heat exchange output fluid from a source thereof that is to be utilized for effecting a heat exchange function in a zone and for receiving return fluid resulting from said output fluid providing its heat exchange function in said zone, thermally operated means carried by said housing means adapted to control the amount of flow of said output fluid from said source that is to be utilized for said heat exchange function in said zone in relation to the temperature of said thermally operated means, and control means adapted to be controlled by a zone temperature sensing means for directing one of said output fluid and said return fluid to said thermally operated means to cause the same to be adapted to change the amount of flow of said output fluid when the temperature effect of said heat exchange function in said zone deviates from a predetermined temperature by a certain amount, said control means having means adapted to cause said control means to operate said thermally operated means in a modulating manner, said means of said control means comprising velocity responsive means adapted to be responsive to the velocity of said flow of said output fluid from said source.

20. A control unit as set forth in claim 19 wherein said thermally operated means comprises wax charged piston and cylinder thermal means.

21. A control unit as set forth in claim 19 wherein said means of said control means also comprises feedback means controlled by said thermally operated means and being operatively associated with said control means to provide for said modular operation of said thermally operated means.

22. A control unit as set forth in claim 21 wherein said feedback means comprises a balance beam arrangement.

23. A control unit as set forth in claim 22 wherein said balance beam arrangement has a leak port means and a pivotally mounted beam for opening and closing said leak port means, said thermally operated means being operatively interconnected to said beam by said velocity responsive means whereby movement of said thermally operated means is adapted to cause a change in the force of said velocity responsive means acting on said beam.

24. A control unit as set forth in claim 23 wherein said control means adapted to be controlled by said sensing means comprises a fluid operated valve means adapted to direct said output fluid to said thermally operated means when said sensing means moves said valve means to one of its operating positions, said leak port means being operatively associated with said fluid operated valve means for operating the same.

25. A control unit as set forth in claim 21 wherein said means adapted to be controlled by said sensing means comprises an aspirator adapted to draw said return fluid to said thermally operated device when said aspirator has fluid directed therethrough, said valve means being adapted to cause output fluid to be directed through said aspirator when said sensing means moves said valve means to another operating position thereof.

26. A control unit as set forth in claim 23 wherein said velocity responsive means includes a flexible diaphragm that is carried by said housing means and is adapted to be moved in response to changes in said velocity of said flow of said output fluid, said velocity responsive means having interconnecting means interconnecting said diaphragm to said beam.

27. A control unit as set forth in claim 26 wherein said interconnecting means comprises a pivotally mounted lever having one end interconnected to said flexible diaphragm and the other end thereof interconnected to said beam.

28. A method for operating a heat exchange system for a zone comprising the steps of providing a source of heat exchange output fluid for effecting a heat exchange function in said zone, providing a source of return fluid resulting from said output fluid providing its heat exchange function in said zone, controlling the amount of flow of said output fluid from said source that is to be utilized for said heat exchange function in said zone by a thermally operated means in relation to the temperature of said thermally operated means, sensing the temperature effect of said heat exchange function in said zone with a sensing means in relation to a predetermined temperature that said heat exchange system is to provide in said zone, directing one of said output fluid and said return fluid to said thermally operated means by control means under the control of said sensing means to cause the same to change the amount of flow of said output fluid when said temperature effect in said zone deviates from said predetermined temperature by a certain amount, causing said control means to operate said thermally operated means in a modulating manner with means of said control means, and operating said means of said control means with the velocity of said flow of said output fluid from said source.

29. A method as set forth in claim 24 and including the step of forming said means of said control means from feedback means that is controlled by said thermally operated means and is operatively associated with said control means.

30. A method as set forth in claim 25 and including the step of forming said feedback means from a balance beam arrangement.

31. A method as set forth in claim 26 and including the steps of forming said means of said control means with a flexible diaphragm that is moved in response to changes in said velocity of said flow of said output fluid, and interconnecting said diaphragm to said beam.

32. A method as set forth in claim 27 wherein said interconnecting step comprises the step of pivotally mounting a lever so as to have one end interconnected to said flexible diaphragm and the other end thereof interconnected to said beam.

33. A method as set forth in claim 27 and including the steps of providing a duct for directing said flow of said output fluid to said zone, and providing said duct with a damper therein that is controlled by said thermally operated means to change the velocity through said duct.

34. A method for operating a heat exchange system for a zone comprising the steps of providing a source of heat exchange output fluid for effecting a heat exchange function in said zone, providing a source of return fluid resulting from said output fluid providing its heat exchange function in said zone, controlling the amount of flow of said output fluid from said source that is to be utilized for said heat exchange function in said zone by a thermally operated means in relation to the temperature of said thermally operated means, selecting within limits the maximum amount of output fluid flow for said zone with selecting means, and directing one of said output fluid and said return fluid to said thermally operated means by control means under the control of said selecting means to cause the same to change the amount of flow of said output fluid to said zone when said output flow deviates from the selected amount by a certain amount.

35. A method as set forth in claim 34 and including the steps of causing said control means to operate said thermally operated means in a modulating manner with means of said control means, and operating said means of said control means with the velocity of said flow of said output fluid from said source.

36. A method as set forth in claim 34 and including the step of forming said means of said control means from feedback means that is controlled by said thermally operated means and is operatively associated with said control means.

37. A method as set forth in claim 36 and including the step of forming said feedback means from a balance beam arrangement.

38. A method as set forth in claim 37 and including the steps of forming said means of said control means with a flexible diaphragm that is moved in response to changes in said velocity of said flow of said output fluid, and interconnecting said diaphragm to said beam.

39. A method as set forth in claim 38 wherein said interconnecting step comprises the step of pivotally mounting a lever so as to have one end interconnected to said flexible diaphragm and the other end thereof interconnected to said beam.

40. A method as set forth in claim 38 and including the steps of providing a duct for directing said flow of said output fluid to said zone, and providing said duct with a damper therein that is controlled by said thermally operated means to change the velocity of flow through said duct.

* * * * *